Dec. 23, 1941.  J. P. SEAHOLM  2,266,819
DISK HARROW
Filed June 22, 1940  4 Sheets-Sheet 2
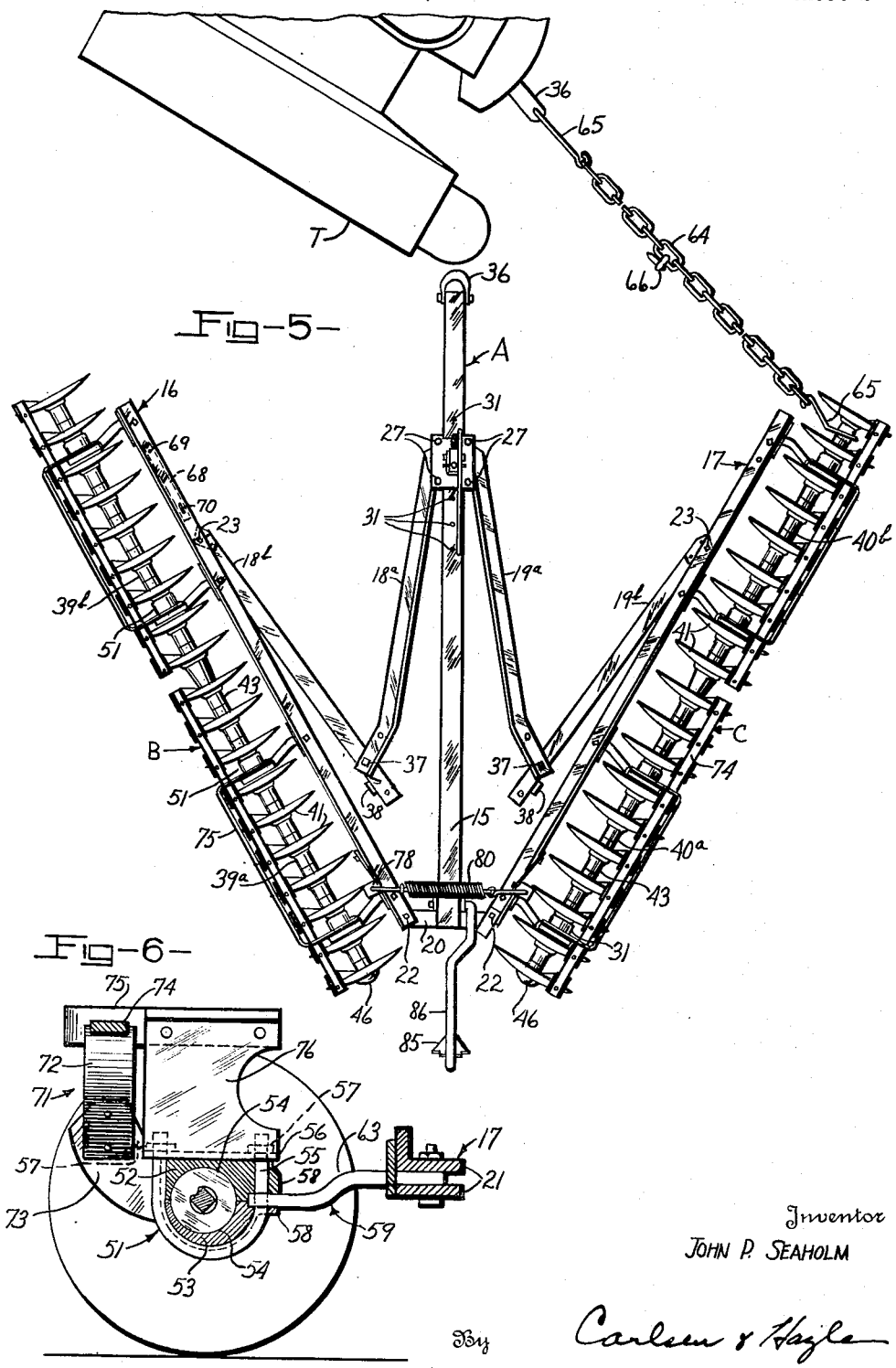
Inventor
JOHN P. SEAHOLM
By Carlsen & Hayle
Attorneys

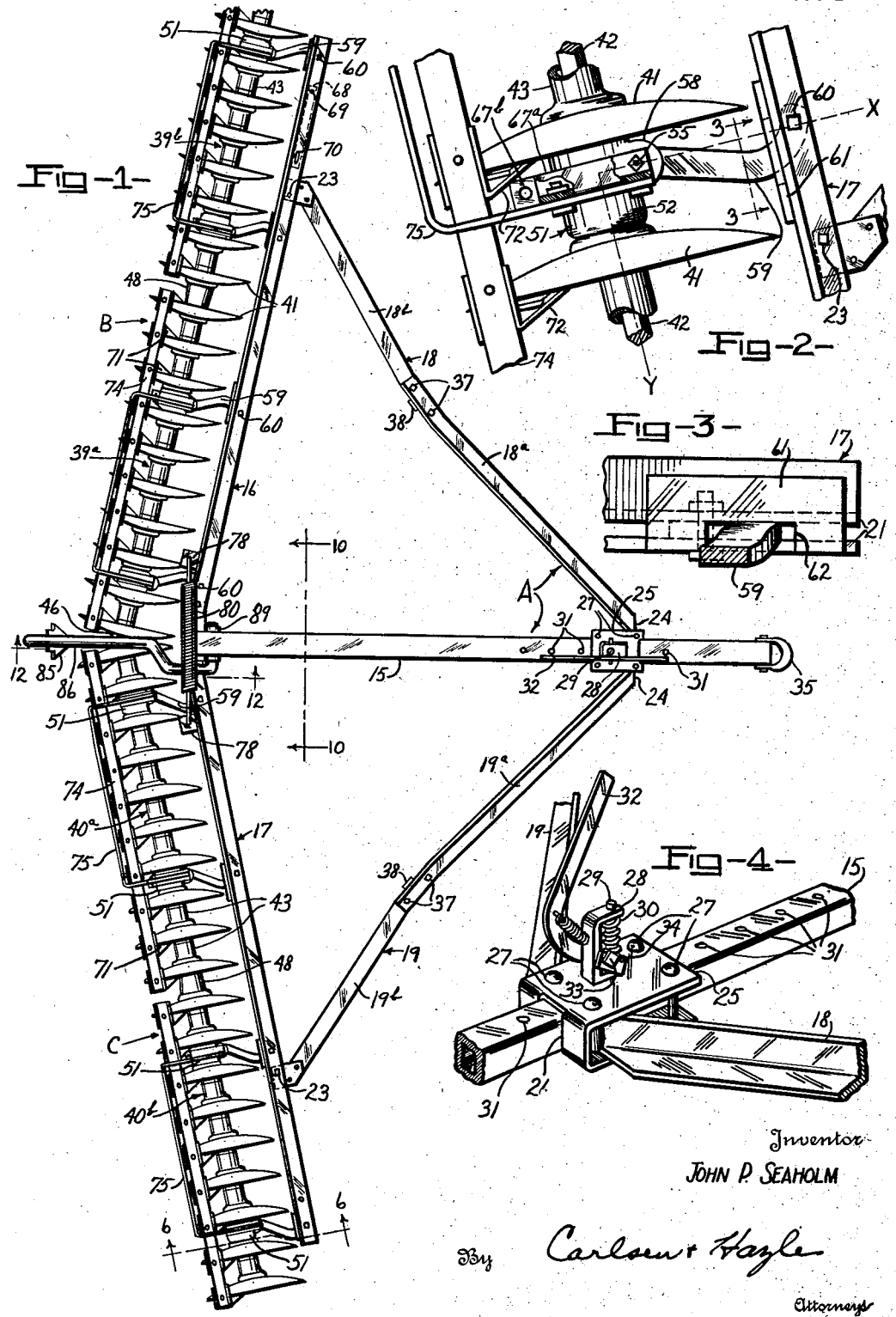

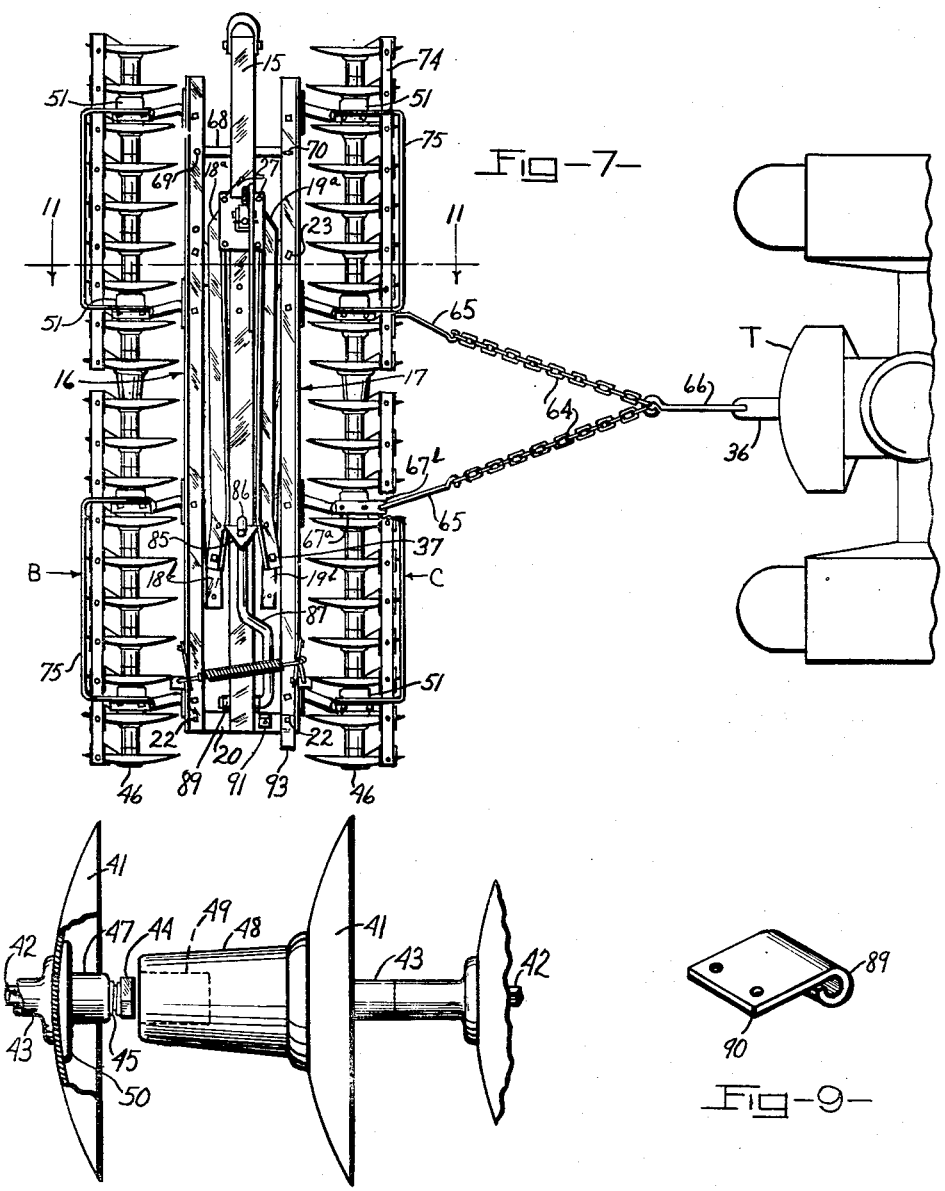

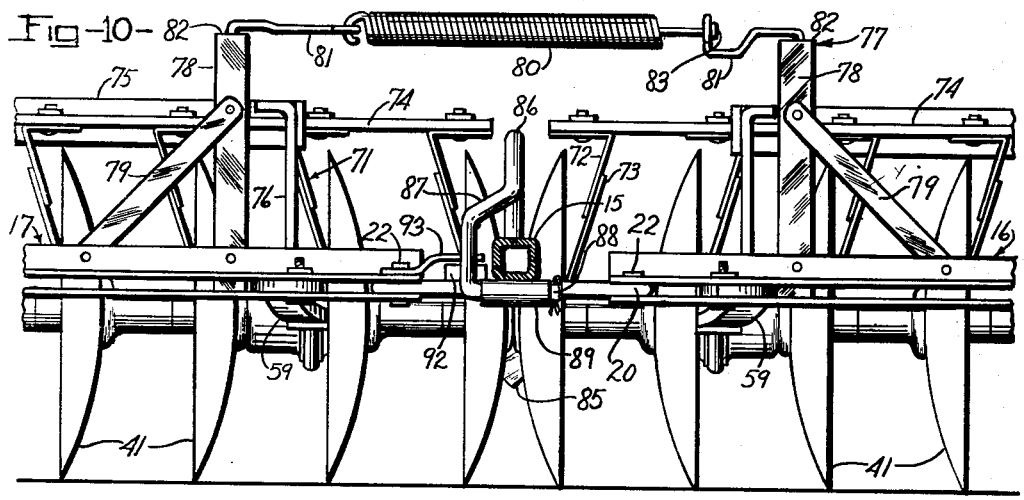
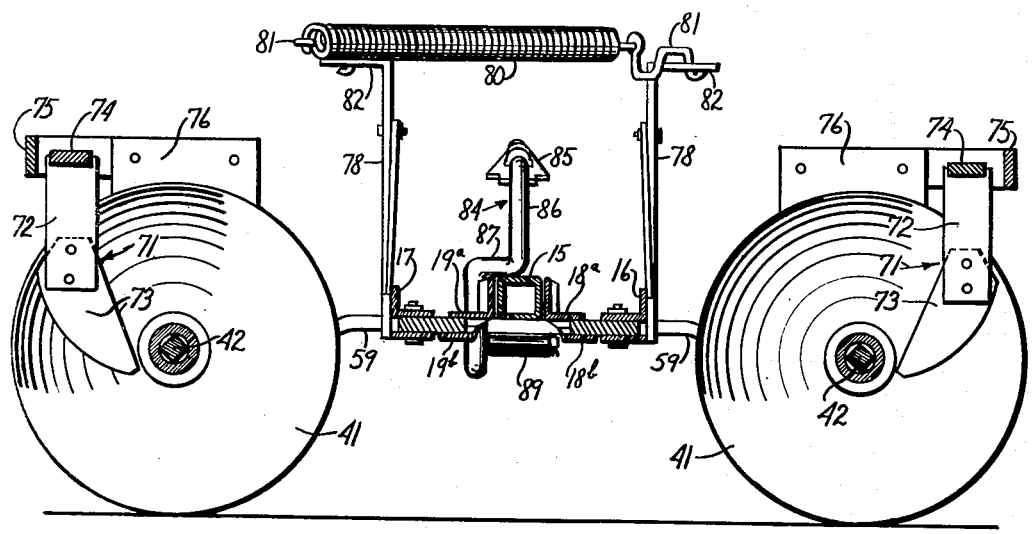
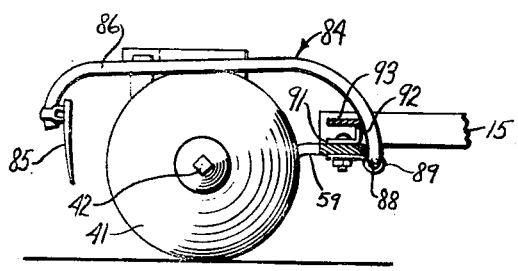

Patented Dec. 23, 1941

2,266,819

UNITED STATES PATENT OFFICE 2,266,819

DISK HARROW

John P. Seaholm, Moline, Ill., assignor to Minneapolis-Moline Power Implement Company, Minneapolis, Minn., a corporation of Delaware Application June 22, 1940, Serial No. 341,867

13 Claims. (Cl. 55—81)

This invention relates to disk harrows and more particularly to improvements in the wide cut type of harrow such as shown in my copending applications Serial No. 270,960, filed May 1, 1939, now Patent No. 2,226,586 and Serial No. 282,091, filed June 30, 1939, now Patent No. 2,226,587.

In the wide cut type of harrow it is possible to use very long disk gangs in order to work a wide strip of ground at each trip around the field, but the difficulty lies in the transport of such harrows through gates and other relatively narrow passageways. My previous applications above identified have dealt with this matter, and in a very effective manner, by providing that the disk gangs be folded or collapsed for transport to an effective width not greater than the length of one gang alone. The primary object of the present invention is to further improve the frame structure and connections in order to facilitate the gang folding and make it possible to fold the gangs, and then return them to outspread working positions, all without manual lifting or heavy operation of any kind and solely by manipulation of the tractor used for pulling the harrow.

Further objects of the invention are to provide improved draft connections for the gangs in order to eliminate or greatly reduce unequal bearing wear and stresses, and to provide an improved gang structure and assembly with means for holding the entire series of disks and bearing and spacing spools continuously in tightly assembled relation.

Another and important object is to provide an extremely simple and effective center shovel attachment by means of which the ridge, usually formed between inner ends of the disk gangs, may be broken out and spread. This shovel is adjustable as to operating depth and likewise is automatically raised and lowered when the disk gangs are angled to their non-working or working positions.

These and other more detailed and specific objects will be disclosed in the course of the following specification, reference being had to the accompanying drawings, in which—

Fig. 1 is a plan view of my improved disk harrow with the gangs disposed at a working angle.

Fig. 2 is an enlarged fragmentary plan view of a portion of the right hand disk gang showing the drag link connection to the side bar or draft beam.

Fig. 3 is a detail sectional view taken along the line 3—3 in Fig. 2.

Fig. 4 is an enlarged fragmentary perspective view of the angling connection between the main draft member and the brace or angling bars.

Fig. 5 is a plan view showing the disk gangs partially folded and showing the tractor connected to one gang for pulling the same to its folded position.

Fig. 6 is an enlarged and vertical cross section through one disk gang taken along the line 6—6 in Fig. 1.

Fig. 7 is a plan view of the harrow in its completely folded or collapsed condition and showing the transport connection to the tractor.

Fig. 8 is an enlarged detail view of the adjacent end portions of inner and outer gang sections showing the spring gang fastening and telescopic connection between sections.

Fig. 9 is a detail perspective view of the mounting bracket for the center shovel.

Fig. 10 is an enlarged fragmentary cross sectional view along the line 10—10 in Fig. 1, but showing the disk gangs in their axially aligned non-working positions.

Fig. 11 is an enlarged cross sectional view along the line 11—11 in Fig. 7.

Fig. 12 is a longitudinal sectional view on the line 12—12 in Fig. 1, showing the center ridge break out shovel in its elevated non-working position.

Referring now more particularly and by reference characters to the drawings, my improved disk harrow is seen to comprise as its main elements a draft frame assembly A and two disk gangs B and C which, in their working positions, are disposed abreast and in oppositely extended, forwardly angled positions as best seen in Fig. 1.

The draft frame structure A includes a central fore and aft extended or longitudinal main draft member or tongue 15 to the rear end of which is pivotally connected the normally outwardly extended side or draft bars 16 and 17 which may be retained in adjusted positions by the diagonal brace bars 18 and 19. The rear end of the tongue 15 carries a rigidly mounted center plate 20 and the draft bars 16 and 17 are composed of spaced, superimposed bars or members 21 (Fig. 6) the inner ends of which embrace the ends of the plate 20 and are pivotally connected thereto by vertically axised pivots 22. The draft bars are thus mounted for forward and rearward folding operations in horizontal planes toward and away from the axis of the tongue as will be clearly evident.

The brace bars 18 and 19 are formed in front and rear toggle-acting sections or arms 18a—18b and 19a—19b respectively, and at rear ends the bars are pivotally connected on vertical axes at 23 to the draft bars at points spaced well outward toward the free ends thereof. From these points the brace bars converge forwardly and inwardly and at their forward ends they are pivotally connected at 24 between the spaced upper and lower sides of a slidable connecting member 25. Said member 25 is formed of a length of sheet material bent back on itself in U-shape (Fig. 4) with an opening 26 in its bight to slidably receive the tongue 15 and with vertically axised fasteners 27 to hold upper and lower sides of the member in slidable engagement with the tongue.

A latch mechanism is provided on the connecting member 25 and comprises a bracket 28 secured thereto and with a latch pin 29 supported for vertical sliding movement. A coil spring 30 on the pin 29 normally urges the same downwardly to enter any one of a series of openings 31 formed in spaced relation along the upper side of the tongue. A lever 32 is pivoted at 33 to the bracket 28 and at one end loosely encircles the latch pin to rest beneath a transversely extended lift pin 34 secured therein. A forward movement of the upper end of the lever, as through remote control by means of a rope connected thereto, will thus raise the latch pin 29 to clear the tongue and allow the member 25 to shift forwardly or rearwardly on the tongue.

By the construction thus detailed it is evident that the draft bars 16 and 17 may be angled forwardly or rearwardly simply by releasing the latch pin 29 and allowing the member 25 (connected to forward ends of the brace bars 18—19) to shift forwardly and rearwardly on the draft tongue.

The forward end of the tongue 15 has a clevis or connection at 35 by which it may be attached to the drawbar 36 of the tractor T.

The front and rear sections 18a—18b and 19a—19b of the brace bars are formed of oppositely faced angle irons and at their meeting ends the front sections overlie the rear sections for some distance as best seen in Fig. 1.

These meeting ends are connected in each case with a pair of bolts or fasteners 37 and are offset angularly from the axes of the main portions of the brace bars so that the said fasteners fall to the inside of a line extended between the pivot connections 23 and 24 at the ends of the bars. As a result, therefore, when one of each pair of fasteners 37 is removed (Fig. 5) the respective front and rear sections of the brace bars will tend to fold or jackknife automatically inward when an endwise stress is placed thereon, as will hereinafter appear. To prevent any tendency of the front and rear brace bar sections to fold outwardly the lower forward ends of the rear sections carry upstanding stop flanges 38 which bear against upper ends of the forward sections.

The various frame parts are, as thus far described, all so located in the horizontal plane relative to each other that the desired folding and angling adjustments may be made and the relative overlapping and intrafitting of the pivoted ends, particularly of the brace bars, has a desirable function as will hereinafter appear.

The disc gangs B and C are generally identical in construction and differ only in that the individual disks and certain other parts, as will appear, are reversed from one side to the other so that the dished or concaved sides of the disks will face outwardly on both gangs. Each gang is made up of inner and outer sections 39a—40a and 39b—40b respectively, and each section comprises a plurality of disks 41 assembled upon a gang bolt or axle 42 and spaced apart thereon by spacing spools 43. At the outer end of each gang bolt 42 a nut 44 is provided, and this nut (see Fig. 8) is drawn up against a spring washer 45, the purpose of which is to hold the individual disks and spools in assembled relation and to automatically take up any wear which may occur between the many surfaces held together by the gang bolt. In disk gangs quite rapid and usually uneven wear occurs when the parts become loose, and it is well nigh impossible to then hold the parts in proper relationship after such wear has taken place.

The type of washer here used has hitherto been employed for holding the fish plates to meeting ends of railroad rails. An idea of its power may be had from the fact that after a reduction in the distance between the head and nut of the bolt of about one-sixteenth of an inch the washer will still exert about twenty-five hundred pounds of pressure upon the parts being held.

The gang bolts of the inner gang sections 39a—40a are provided at inner ends with convexed or rounded bumpers 46 which, in the working angle of the gangs bear against each other and mutually support the gangs against the endwise and inward stresses placed thereon by the action of the disks in the ground. The meeting ends of inner and outer gang sections (see Fig. 8) are respectively provided with short bearing sleeve sections 47 and longer bearing blocks or members 48. Cavities 49 in the inner ends of the blocks 48 freely receive the bearing sleeve sections 47 (as well as the nuts 44 and springs 45 aforesaid) and the ends of the blocks bear on the flanges 50 to distribute the end thrust between gang sections while maintaining them in proper axial alignment. At the same time this connection provides for the necessary differential in rotating speed between inner and outer gang sections when the harrow makes a turn in the field.

Each gang section is provided with a pair of bearings which embrace certain of the spools 43 and serve as part of the draft connections between the draft frame and the gangs. These bearings are represented generally at 51 and are of the split type (see Fig. 6) made up of upper and lower sections 52 and 53 joined, with their mating grooves 54 embracing the spools, by U-bolts 55. Clamp plates 56 are held on the upper sides of the bearings by drawing the nuts 57 of the bolts 55 tight thereagainst.

At their forward sides the bearing sections 52 and 53 have registering lugs 58 which are vertically apertured to pass one leg of the bolts 55 and are spaced apart vertically to receive the rear end of drag links 59. These drag links, one for each bearing, are pivotally connected to the bearings by passing the U-bolts 55 through the apertured rear ends of the links disposed between the lugs 58 and from these points the links extend forwardly and are pivoted at 60 to the draft bars 16 and 17.

The aforesaid connection by the drag links 59 transmit the draft from the side bars 16 and 17 to the disk gangs and the pivotal connections are of course such that the various frame parts will be supported at proper height as the disks rest on the ground.

Referring particularly to Figs. 1 and 2 it will be noted that forward ends of the drag links 59 are curved or offset in the horizontal plane so that the straight rear portions of the links angle away from the next adjacent (inwardly) disks. The pivotal connections of the drag links permit the disk gangs themselves to shift axially or transversely with respect to the harrow frame as is required in the various angling adjustments and in operation and the aforesaid curvature of the links prevents the disk edges from contacting the links in this operation.

Such shifting movement of the gangs is, however, limited by the provision of stops at least on a part of the drag links 59 and these stops may, as shown in Fig. 3, take the form of plates 61 welded, riveted, or otherwise secured to rear edges of the bars 16 and 17 and slotted at 62 to clear the drag links. The length (horizontally) of the slots 61 is of course so proportioned that swinging movement of the drag links will be limited in both inward and outward direction to the point that the disk edges will never under any circumstances contact the side bars.

In order to provide better clearance beneath the frame parts the side bars 16 and 17 stand somewhat above the level of the axes of the disk gangs (Fig. 6) and the drag links 59 are bent upward at forward ends 63 to properly connect the parts.

In operation the gangs B and C are adjusted to about the outwardly spread and forwardly angled position shown in Fig. 1 and when drawn across the field a wide strip of ground will of course be worked by the disks. Adjustment of this working angle is made by proper placement of the latch pin 29 in the tongue openings 31 and may be controlled at will by the tractor operator from his station on the tractor. The gangs may also be swung rearwardly to substantially axially aligned positions and held thereat when it is desired to move across the field without working the soil. In all of such angling adjustments, as well as in the operation of the harrow, the gangs mutually abut and support each other at their inner ends and the necessary shifting movement is provided by the pivotally acting drag link connections.

It may here be noted that the drag link structure is such that, in the best working angle of the gangs, the draft line X (in Fig. 2) passing through the drag link pivots 55 and 60 will be almost exactly at right angles to the axis Y of the gang. As a result the draft forces will be exerted on the gangs without the usual tremendous end thrust and wear will be greatly reduced. This feature is described and disclosed in greater detail in my copending application Serial No. 270,960 (Patent No. 2,226,586), hereinbefore referred to.

To transport the harrow from field to field or under other circumstances requiring that it pass through relatively narrow openings, the operator first removes one of the fasteners 37 from each brace bar 18 and 19. As a preferable course then, the tractor T is disconnected from the tongue 15 allowing the forward end thereof to drop to the ground and a short length of chain 64 (Fig. 5) is connected by one hook 65 to the drawbar 36. Another hook 65 on the chain is then placed over an outer end of one disk gang and the tractor is guided in an arcuate path to pull this gang around and fold it with the tongue alongside the other gang, whereupon the harrow is compactly folded as shown in Fig. 7. In these folding operations the brace bars 18 and 19 automatically jackknife in the proper directions due to their off center connection, as heretofore described, and they require no further attention once the fasteners 37 are removed.

In the folded condition then the chain 64 is connected by a center hook 66 to the drawbar of the tractor (Fig. 7) and at diverging rear ends is connected by the hooks 65 to one disk gang. The harrow may then be pulled forward rolling on its own disks, or it may be arranged on some form of transport truck (not shown) but in any event it will be quite evident that the width has been effectively halved so that the harrow may pass through any usual gate or passageway.

For convenience in making the transport draft connections the two center bearings 51 of each disk gang B and C are provided with hitch bars 67a secured in place by the U-bolts 55 and having rearwardly extended apertured ends 67b for engagement by the hooks 65 when the gangs are folded. The draft connection may thus be made to either gang as may be most convenient.

Reversing the foregoing processes will serve to again unfold and set up the harrow for operation, and it will be evident that no laborious or weighty hand operation is required in either case.

In the folded condition the free ends (formerly outer ends) of the gangs may be retained in proper position by a tie bar or strap 68 which is connected at opposite ends at 69—70 to the side bars 16 and 17. This strap is preferably pivoted at the connection 69 between the members 21 making up one side bar, and it may be folded between these members (not Fig. 1) when not in use. The other connection 70 takes the form of an eyed pin which may be used for either holding the strap in folded position or in gang connection position, as will be evident.

As noted, the tongue 15 is dropped when the tractor is disconnected for carrying out the folding operations. However, as the gangs are folded or moved inward the pivotal actions of the side bars 16 and 17 and particularly of the brace bars 18 and 19 as their respective sections collapse, will serve to raise the tongue and allow the brace bar sections 18a and 18b and 19a—19b to finally come to rest in overlapping positions as shown in Fig. 7. This action permits the maximum of compactness to be achieved in the folded harrow, as will be quite evident.

The individual disks 41 are each provided with a scraper designated generally at 71 which comprises a mounting member or hanger 72 and a replaceable blade 73 riveted or otherwise secured in place thereon. The blades 73 are cut from spring steel and require no sharpening and when worn they may be readily replaced without disturbing the entire mounting assembly.

The scrapers are, as usual, carried upon bars 74 which are slidably supported lengthwise of the disk gangs. The usual means (not shown) is employed to adjust the scrapers with respect to the disks and the conventional weight boxes (also not shown) may be supported above the scrapers. The bars 74, one for each gang section of course, are slidably carried in yokes 75 secured atop brackets 76 which are supported on the bearings 51 by the bearing clamp bolts 55 as best illustrated in Fig. 6.

In the operation there is, as well known, a tendency for the inner ends of the disk gangs to move upwardly due to the end thrust against the disks. In order to resist this action and thus insure even penetration of the disks across the entire width of the harrow I provide a spring action hold-down device or snubber designated generally at 77 and which comprises upright standards or members 78 which are secured to the side bars 16 and 17 adjacent their inner ends. Diagonal braces 79 secured between the side bars and the standards serve to hold the latter rigidly erect, and a strong retractile coil spring 80 is provided at each end with hooked connectors 81 by which it is engaged with apertured horizontally turned upper ends 82 of the standards. The tension of this spring 80 is adjusted by the screw 83 to the point that its pull upon upper ends of the standards is sufficient to exert an upward pull on outer ends of the disk gangs and counteract their tendency to draw up at inner ends.

As the harrow travels over the field it leaves an unbroken ridge or strip between the adjacent innermost disks 41 and to break out this ridge I provide a center shovel or middle breaker attachment 84 comprising a shovel or blade 85 which is secured to the downwardly turned rear end of a beam 86. The beam 86 extends forwardly between the inner disks and above the center thereof and is offset at 87 in the horizontal plane so that its downwardly curved forward end may pass downwardly alongside the rear end of the tongue 15. The beam end has a transversely turned bearing portion 88 which is pivotally received in the eye or roll 89 of a bracket 90 secured to the underside of the tongue and the beam is thus free to swing in an up and down longitudinal plane. A depth gauge 91 is adjustably secured alongside the tongue on the plate 20 and has an upturned end 92 which may be adjusted in a fore and aft direction to engage the forward end portion of the beam 86 and thereby limit the downward movement of the beam. The shovel 85 may thus be caused to enter the ground along the center line of the harrow to any desired depth and thereby break out the ridge left by the disks.

One side bar, as 17, carries a projection or finger 93, either as an integral part or a rigidly mounted bracket, which also lies in the path of the downwardly curved forward end of the beam 86. This finger is adjusted or positioned so that, when the gangs B and C are straightened for travel around the field, the finger will move forward and engage the beam to swing the shovel automatically upward clear of the ground as shown in Fig. 12. Once the depth gauge is set then the operation of the shovel attachment is entirely automatic.

When the gangs are folded for transport the spring 80 (loosened at this time) may be unhooked at one end from a standard 78 and the beam 86 may then be swung forwardly until its offset 87 rests on the tongue 15, as shown in Fig. 7, and the shovel will then be entirely out of the way.

The standards 78 may be so located and supported on the side bars 16 and 17 that their lower ends may act as stops for the inner drag links 59 if so desired, thus resulting in a reduction in the number of parts required.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A harrow structure comprising a pair of gangs normally arranged in outspread positions, and foldable forwardly about inner end connections, and sectional brace members for transmitting draft forces to the gangs in their outspread positions and foldable inwardly with the gangs.

2. A disk harrow structure comprising a draft member, disk gangs connected at inner ends to the draft member and foldable forwardly about said inner end connections from outwardly spread positions to transport positions adjacent the draft member, and toggle acting brace members connected between the draft member and gangs and foldable inwardly between the gangs and said draft member.

3. A disk harrow structure comprising a draft member, disk gangs connected at inner ends to the draft member and foldable forwardly about said inner end connections from outwardly spread positions to transport positions adjacent the draft member, and brace members connected in diagonal positions between the draft member and gangs and foldable inwardly at medial points between the gangs and draft member in the transport positions of the gangs.

4. A disk harrow comprising a longitudinally extending draft member, disk gangs connected at inner ends to the draft member and foldable forwardly about said connections from outwardly extending position to transport positions alongside the draft member, and brace members connected at their ends between the draft member and disk gangs in rearwardly diverging positions, the said brace members including front and rear sections having pivotally connected meeting ends foldable inwardly in the transport position of the gangs.

5. A disk harrow comprising a longitudinally extending draft member, disk gangs connected at inner ends to the draft member and foldable forwardly about said connections from outwardly extending position to transport positions alongside the draft member, and brace members connected at their ends between the draft member and disk gangs and normally extending in rearwardly diverging positions therebetween, the said brace members comprising front and rear sections having ends pivotally connected to each other at points offset inwardly from a line between the connections to the gangs and draft member whereby the brace members may automatically fold inwardly at said meeting ends under compression as the gangs are folded to transport positions.

6. A disk harrow comprising a longitudinally extending draft member, disk gangs connected at inner ends to the draft member and foldable forwardly about said connections from outwardly extending position to transport positions alongside the draft member, and brace members connected at their ends between the draft member and disk gangs and normally extending in rearwardly diverging positions therebetween, the said brace members comprising front and rear sections overlapping at meeting ends and connecting thereat to fold inwardly as the gangs are folded to their transport positions, and the said front and rear sections of the brace members being arranged to overlap each other substantially throughout their length in their folded positions.

7. A disk harrow comprising a longitudinally extending draft tongue, disk gangs connected at inner ends to a rear end of the tongue and foldable forwardly about said connections from outspread working angles to transport positions substantially parallel with the tongue, brace members connected between the tongue and the gangs for transmitting draft forces and supporting the gangs in working positions, the said brace members comprising cooperating connected sections foldable inwardly in overlapping relation as the gangs are folded to transport position, and the said sections of the brace member being connected to the tongue to elevate and support the forward end thereof as the gangs are folded.

8. A disk harrow comprising a draft member, side members connected at inner ends to the draft member, disk gangs connected to the side members and foldable about the inner end connections thereof from outspread positions to transport positions adjacent the draft member, and a tie member pivotally connected to one side member and normally foldable alongside that member but extensible therefrom for connection to the other side member in the transport position of the parts.

9. In a disk harrow, a pair of disk gangs foldable forwardly about inner end connections from outwardly spread working positions to substantially parallel transport positions, and means for connecting a draft device to the gangs while in such transport positions so that they may be drawn on their own disks and in positions at right angles to the direction of travel.

10. In a disk harrow, a pair of disk gangs foldable forwardly about inner end connections from outwardly spread working positions to substantially parallel transport positions, and hitch members extended from one of the gangs in the folded positions thereof for the connection of a draft device to such gang and for transporting the folded gangs on their own disks and in positions at right angles to the direction of travel.

11. In a disk harrow, a pair of disk gangs connected at inner ends for forward folding movement from outspread working positions, means for connecting a draft device to an outer portion of one gang for folding said gang around to a position substantially parallel with the other gang, and hitch means for connecting a draft device to one folded gang for transporting the harrow on its disks while in a general position at right angles with respect to the direction of travel.

12. In a disk harrow, a draft member, a pair of disk gangs connected to the draft member for forward folding movement from outspread working positions to transport positions substantially parallel with the draft member, bearings on the disk gangs for transmitting draft forces thereto, and hitch bars secured to the bearings and extended therefrom outwardly in the folded position of the gangs for connecting a transport draft device to either of the gangs.

13. A disk harrow structure including a disk gang, a draft member extending along the forward side of the gang, the said member comprising vertically spaced and superimposed bars, drag links extended forwardly from the gang and at their forward ends entering the space between the respective bars of the draft member, and a connecting element extended through the bars and forward ends of the drag links.

JOHN P. SEAHOLM.